Aug. 25, 1942.　　J. R. SONNEBORN ET AL　　2,294,215
APPARATUS FOR MAKING CONTAINERS
Filed Oct. 2, 1939　　2 Sheets-Sheet 2
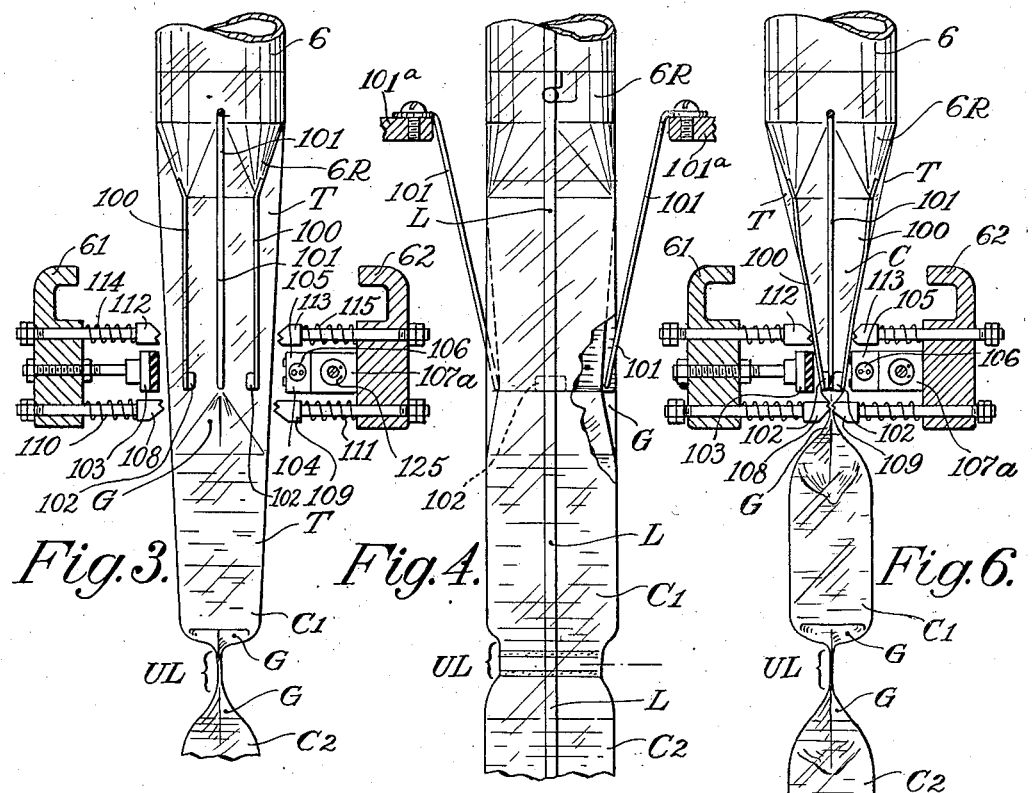
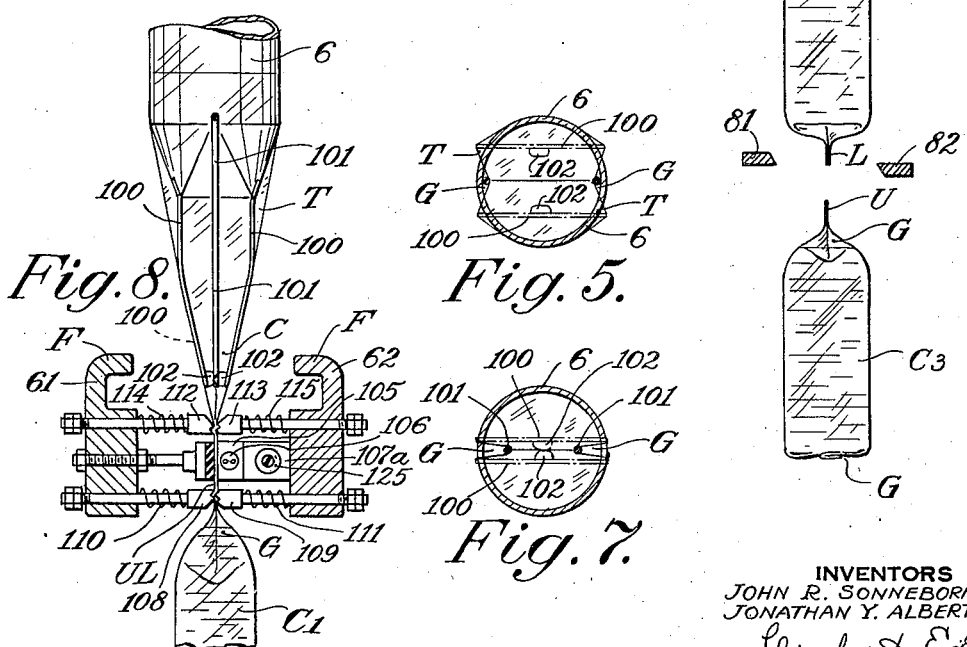
INVENTORS
JOHN R. SONNEBORN AND
JONATHAN Y. ALBERTSON
ATTORNEY Patented Aug. 25, 1942

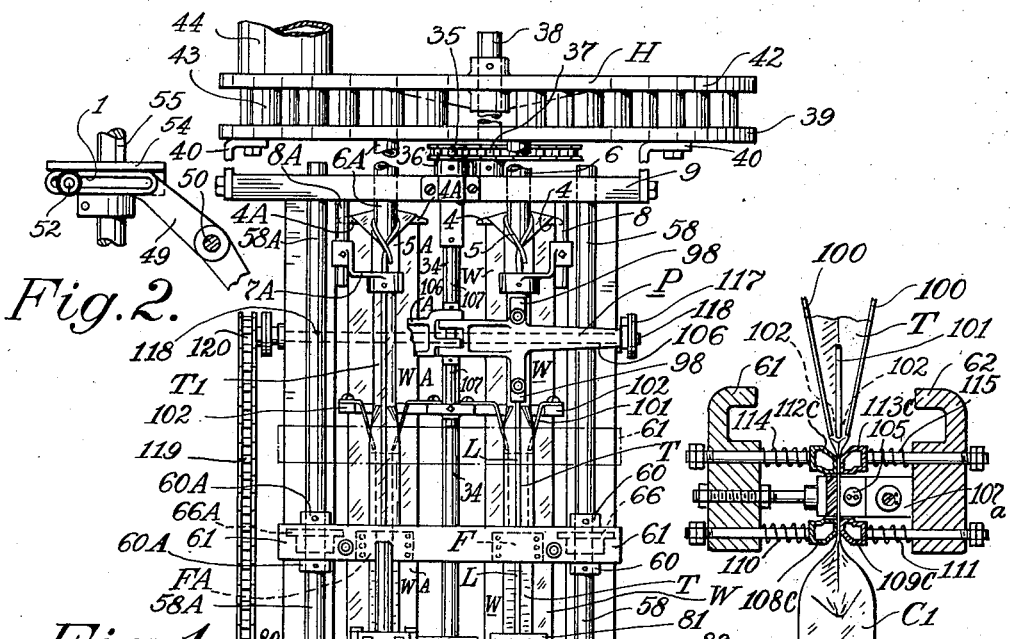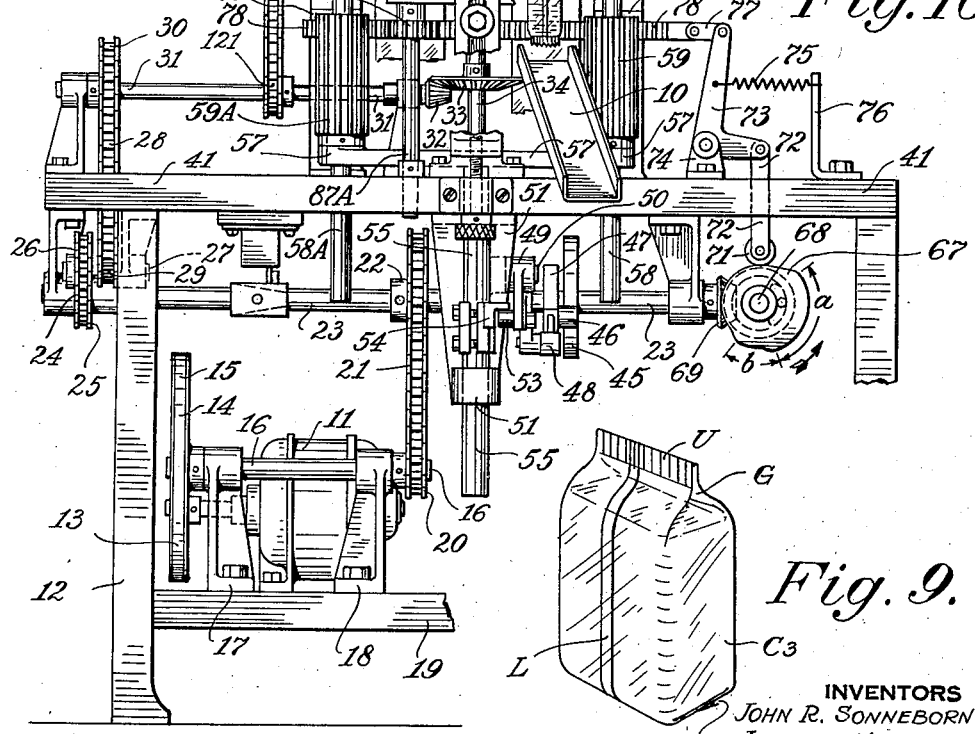

2,294,215

UNITED STATES PATENT OFFICE 2,294,215

APPARATUS FOR MAKING CONTAINERS

John R. Sonneborn, Willow Grove, and Jonathan Y. Albertson, Philadelphia, Pa., assignors to Stokes and Smith Company, Summerdale, Pa., a corporation of Pennsylvania Application October 2, 1939, Serial No. 297,484

17 Claims. (Cl. 93—18)

Our invention relates to apparatus for making containers from flexible material, more particularly thermoplastic material such as Pliofilm, Cellophane, and the like.

In accordance with one aspect of our invention, webbing is shaped about a stationary form into a tube whose opposite sides are creased during feed of the webbing and are tucked in along the creasing substantially concurrently with flattening of the tube beyond the form to provide seals for containers which, because of aforesaid tucking in of the tube sides, have gusset folds within and adjacent their sealed ends; more particularly, the creasing and tucking in of the sides of the tube are effected by members which are biased to move between plates extending within the tube beyond the form, and which plates are moved toward one another by clamping or sealing members which flatten the tube as aforesaid.

In accordance with another aspect of our invention, when the webbing is of thermoplastic material, the transverse seal portions while heated are relieved of feeding tension by auxiliary clamping members which are artificially cooled, as by passage of a cooling medium through them.

Our invention further resides in the features of combination, construction and arrangement hereinafter described and claimed.

For an understanding of our invention, reference is to be had to the accompanying drawings in which:

Fig. 1 is a front elevational view, with parts broken away, of a machine for making, filling, and sealing gusset-type containers;

Fig. 2 is a detail view, in side elevation, of parts appearing in Fig. 1;

Fig. 3 is a detail view, in side elevation, and on enlarged scale, of parts appearing in Fig. 1;

Fig. 4 is a front elevational view of parts appearing in Fig. 3;

Fig. 5 is a plan view, discussed in connection with Figs. 3 and 4;

Fig. 6 is a similar to Fig. 3, except the parts are in a different operating position;

Fig. 7 is a plan view, discussed in connection with Fig. 6;

Fig. 8 is similar to Figs. 3 and 6, except the parts are in different operating position;

Fig. 9 shows in perspective a container formed by the mechanism of the preceding figures;

Fig. 10 illustrates a modification of the web-clamping structure shown in Figs. 3 to 8.

Referring to Fig. 1, web material W, fed from a supply roll not shown, is shaped into tubular form by the tools 4 and 5, of construction more fully disclosed in Zwoyer U. S. Patent No. 1,986,422, about the stationary tube or forming member 6 supported by bracket 7 adjustably secured to rod 8 depending from the upper frame member 9 of the machine.

The overlapping margins of web W are joined by a seal-forming device P whose construction and operation are more fully explained in Patent 2,200,971 which issued upon our co-pending application Serial No. 259,748, filed March 4, 1939, thus to form a closed tube T of web material with a seal L extending longitudinally thereof.

To effect engagement of the sealing member 98 of device P with the web margins while the web material is at rest and therefore free of feeding tension and to move member 98 from the web material before the next feeding movement, there is provided a cam 117 secured to shaft 118 driven from shaft 31 by chain 119 which drives sprocket 120 on shaft 118 and is driven by sprocket 121 on shaft 31. The frame 106 which supports sealing member 98 is pivotally mounted upon bar 107 and is biased by a spring, not shown, toward tube 6. While the web is at rest, cam 117 permits the spring to move arm 106 to press member 98 against the overlapping margins of the web shaped about tube 6, and then after a brief dwell forces the arm 106 away from the tube 6 to interrupt contact of member 98 with the webbing before its next feeding movement.

Below the lower open end of the form 6 the tube T of web material is flattened by clamping members of a vertically reciprocating package-forming mechanism F whose construction is hereinafter more fully explained. Closure of the jaws of the device F produces a seal UL transversely of the tube, concurrently to form the bottom of a container (C) to be filled through form 6, and to close the upper end of a previously filled container C. Downward movement of the device F from the position shown in Fig. 3 to the full-line position thereof shown in Fig. 1 pulls further web material over the form 6 to form a further section of tubing T and to bring the longitudinal margins of further web material adjacent the sealing device P. At the end of the down stroke of the mechanism F, a seal UL previously formed between two filled containers is brought into the path of movement of the blades 81, 82 of a web-severing device, similar to web-severing device KA, which operates concurrently with release of the web material by mechanism F to cut through the seal UL between the containers and so detach the lowermost of them from the web material. The detached container slides from the machine along the chute 10.

The particular machine shown is a dual unit; while aforesaid cycle of operation is being performed upon web material W, the same sequence of operations is being performed by similar mechanism upon the web WA; because the mechanism for operating upon web WA is essentially a duplicate of that described for operating upon web W, its components are identified by the same reference characters plus the letter A.

The feeding and severing mechanisms are driven by motor 11 supported by frame 12 of the machine; a pulley 13 on the motor shaft is connected, as by belt 14, to the pulley 15 on one end of a shaft 16 supported by brackets 17, 18 attached to the frame member 19 of the machine; to the other end of shaft 16 is attached a sprocket 20 which, through chain 21, drives a sprocket 22 on the main control shaft 23 of the machine.

The feeding head or turret H which segregates measured amounts of filling for delivery into the tubes 6, 6A, is driven from shaft 23 through the chain 24 which connects sprockets 25 and 26 on shaft 23 and jack-shaft 27, respectively, chain 28 which connects sprocket 29 on shaft 27 with sprocket 30 on shaft 31, bevel gear 32 on shaft 31, bevel gear 33 on shaft 34, and chain 35 connecting the sprocket 36 on the upper end of shaft 34 to the sprocket 37 on shaft 38 of the feeding head H. The particular feeding head shown, which may be replaced by others for different characters of filling for the containers, comprises a stationary plate 39 suitably held as by brackets 40 to the frame member 9 of the machine and provided with openings in registry with or received by the upper ends of the web-shaping tubes 6, 6A. Plate 42 of the head, which is attached to shaft 38, serves as a support for the open-ended measuring tubes 43 received by or in registry with openings through the plate 42 and also serves to prevent escape of material from the hopper 44 except as provided by the openings through the plate 42 into measuring tubes 43.

The movement of the turret of feeding head H is preferably so timed that material is discharged from the forms 6, 6A into the tubes T, T1 of web material substantially at the end of each feeding stroke of the package-forming and web-feeding devices F, FA.

Reciprocation of the feeding device F is controlled by cam 45 attached to the main shaft 23 of the machine; the periphery of cam 45 is engaged by cam follower or roll 46 extending from the member 47 having a forked end embracing the shaft 23 and pivotally connected at 48 to one arm of a bell-crank lever 49 pivotally mounted at 50 upon a bracket 51 depending from the frame member 41 of the machine. The other arm of bell-crank lever 49 is slotted, as shown in Fig. 2, to allow adjustment of the supporting pin 52 of the roller 53 which engages the under surface of the ledge member 54 adjustably secured to plunger 55 guided at its lower end by bracket 51 and passing through frame member 41 for connection to the cross member 57 through which pass the shafts 58, 58A, to which are secured, respectively, the elongated gears 59, 59A whose lower ends serve to receive the thrust of member 57 and transmit it to shafts 58, 58A. The collars 60, 60A serve to support the two members 61, 62, common to the package-forming mechanisms F, FA, while permitting rotation of the shafts 58, 58A for the purposes hereinafter described.

As the cam 45 rotates, once for each cycle of the machine, the bell-crank lever 49 is oscillated to effect reciprocation of member 57 toward and from its uppermost position, Fig. 3 corresponding with the dotted line position thereof shown in Fig. 1. The length of the stroke or extent of vertical reciprocation of the package-forming mechanisms F, FA may be varied for production of containers of different lengths by adjustment of supporting pin 52 of roller 53 in the slotted end of the bellcrank lever 49. For reasons which hereinafter appear, the slot 1 which receives the pin 52 extends, when arm 49 is in its uppermost position, substantially at right angles to the direction of movement of plunger 55, thus to insure that, regardless of the length of stroke, the uppermost position of the package-forming mechanisms F, FA is always the same.

The two members 61, 62 are biased toward or into engagement with each other by springs, not shown, and are intermittently separated from each other by the cams 66, 66A, respectively mounted upon the shafts 58, 58A.

The movement of members 61, 62 toward and away from each other by rotation of shafts 58, 58A is controlled by cam 67 on shaft 68 driven from the main shaft 23 through gearing including the gear 69. The cam follower 71, which continuously engages the periphery of cam 67, is supported at the lower end of a bar 72 which passes through a slot in the frame member 41 for pivotal connection at its upper end to one arm of a bell-crank lever 73 pivotally mounted upon bracket 74 and biased to the position shown in Fig. 1 by the spring 75 extending from the stationary bracket 76. The other arm of bellcrank lever 73 is connected by link 77 to a rack 78, received by guides 79 in the vertical frame members 80 of the machine, and continuously in mesh with gears 59, 59A throughout their reciprocation with the plunger 55. The cam 67 is preferably adjustable angularly with respect to its shaft 68, as indicated in Fig. 1, to permit variation in the timing of the movements of the members 61, 62.

The same cam 67 is utilized to control operation of the web-severing mechanisms K, KA, which may be identical in construction and similar to the web-severing mechanisms shown in aforesaid Zwoyer patent. Suffice to say that concurrently with movement of the members 61, 62, away from each other, the two blades 81, 82, Fig. 6, of the web-severing device K, move toward each other to cut through the webbing intermediate the limits of a seal UL between two adjacent containers, and concurrently a similar set of blades in the head KA severs the webbing WA by cutting through a seal UL between two adjacent containers. Movement of the shaft 87A, which controls the knives of the cutting head KA, is produced by aforesaid reciprocation of rack 78, which is in continuous driving engagement with the gear 94A on shaft 87A; by a similar arrangement, rack 78 controls the operation of the knives 81, 82 of the cutting head K.

As thus far described, the mechanism is not suited to the manufacture of containers of the gusset type. The subsequent description is chiefly concerned with modifications of or additions to aforesaid machine, suiting it for production of such gusset-type containers; it is to be understood, however, that in its broader aspects, and particularly its method aspects, our invention is not limited to improvements upon the particular package-forming machine shown in the aforesaid Zwoyer patent.

Referring to Figs. 3 to 8, from the lower end of the forming tube 6, there extends the pair of plates 100 which in effect form a continuation of the tube 6. The distance between the plates as viewed in Fig. 3 and the distance between the vertical edges of each plate, as viewed in Fig. 4, is such that there is defined a rectangle whose perimeter is at least approximately equal to the perimeter of tube 6 (Fig. 5). The plates 100 are preferably of springy metal to insure their return to the position shown in Fig. 3 after they have been flexed during flattening of the tube T of the web material, as hereinafter described.

The two tucking members 101, 101, preferably wires of springy metal, are fastened at their upper ends to a supporting bracket 101A in such position that, except for restraint imposed upon them by the webbing, they tend to move between the plates 100. Consequently, as the tube T is fed downwardly, as previously described, the tucking members or tools 101, 101 tend to crease opposite sides of the tube, and so start the formation of gusset folds G.

When the plates 100, 100 are moved to the position shown in Fig. 6, as hereinafter described, the tucking tools 101, 101 because of their tension or bias, move toward one another between the plates, as more clearly shown in Fig. 7, to take up the slack in the webbing and so further to tuck in the webbing. To prevent the tucked-in sides of the webbing from being injured by too close approach of the plates 100 and the turn-in tools 101, the former are provided with stops 102 which limit the extent to which the plates 100, 100 can be flexed toward each other.

Referring to Fig. 3, which shows the members 61, 62 in their most separated position and at the top of their stroke, upon one of them, 61, is mounted a clamping or heat-sealing member 103 preferably faced with "Neoprene," an artificial rubber not appreciably affected by the temperatures involved for heat-sealing of Cellophane, Pliofilm, or the like; upon the other of these members, 62, is mounted a complementary web-clamping or heat-sealing member 104 comprising, in the particular example shown, a metal block 105, in which is disposed a thermostat 106, and a metal block 107a in which is disposed a heating coil 125.

In the preferred arrangement shown in Figs. 3 to 8, there are, in addition to the sealing members 103, 104, additional web-clamping members; the lower pair of them, 108, 109, are carried by the members 61, 62, respectively, and are biased to the position shown in Fig. 3 by the springs 110, 111; the upper pair of them, 112, 113, are also carried by the members 61, 62, respectively, and are biased to the position shown in Fig. 3 by the springs 114, 115. When the members 61, 62 are in their most separated position, all of aforesaid clamping members are out of engagement with the web, thus to clear the containers as the package-feeding and forming mechanisms F, FA comprising these members move to their uppermost position.

While the frame members 61, 62 of the mechanisms F, FA, are at the top of their stroke, they move toward one another under the control of cam 67. Referring to Fig. 1, as the cam follower 71 moves off the high section a of cam 67, on to the intermediate section b, the members 61, 62 move from their position shown in Fig. 3 to the position shown in Fig. 6. During this movement, each of the sealing members 103, 104 and the upper pair of auxiliary clamping members 112, 113, if used, press against the lower free ends of the flexible plates 100, 100 and move them toward one another, thus reducing the tension of the webbing between the plates and so allowing the spring members 101, 101 to tuck in the opposite sides of the tubing T, generally as shown in Figs. 6 and 7. The lower pair of auxiliary clamping members 108, 109, if used, for this intermediate position of the frame members 61, 62, clamp the webbing below the plates 100, 100 and so relieve the tubes T above the clamps 108, 109, of tension due to the weight of the filled containers C1, C2, as yet undetached from the webbing.

As the frame members 61, 62 move downwardly under control of cam 45, they move toward one another from the position shown in Fig. 6 to the position shown in Fig. 8, as follower 71 moves over section b of cam 67. By this second movement of the members 61, 62 toward each other, the sealing members 103, 104 apply heat and pressure to the flattened sides of the tube previously engaged by the plates 100, 100 and to the tucked-in sides of the tube previously engaged by the tucking members 101, 101; also by this movement of members 61, 62 toward each other in their downward movement, the upper pair of auxiliary clamping members 112, 113 tightly clamp the flattened webbing above that portion of it being heat-sealed, thus to relieve the heated webbing of the seal from the feeding tension otherwise exerted upon it during the downward movement of the members 61, 62; the lower pair of auxiliary clamping members 108, 109 relieve the heated seal of tension due to the weight of the filled containers C1, C2.

At the bottom of the stroke of members 61, 62, they are moved, under the control of cam 67, to their separated position shown in Fig. 3; and then under the control of cam 45 they are moved while so separated to the top of their stroke (Fig. 3) for the next web-feeding and package-forming stroke.

During the downward feed of the tube T, the tension upon the plates 100, 100 is relieved sufficiently to allow them to return to their position shown in Fig. 3 and the resulting distension of the tube by the plates 100, 100 effects return of the tucking members 101, 101 to their position shown in Fig. 4.

The flexible plates 100, 100 may be replaced by any equivalent structure suited normally to distend the tube T, capable of yielding when engaged by the web-clamping or seal-forming tools to allow movement between them of tucking tools equivalent to the spring members 101, 101; and it is to be understood that for the spring members 101, 101 may be substituted any suitable tucking tools biased to tuck in opposite sides of the tube T between plates 100, 100 or operated by suitable mechanism at proper time in the cycle of operation of the machine.

When it is desired to adapt the machine to make either gusset type containers or containers of the pillow type shown in the aforesaid Zwoyer patent, the plates 100 may be attached to a removable snout 6R having for example a bayonet joint connection to the lower end of tube 6.

Each of the resulting containers, as most clearly appears in Fig. 8, is sealed at both ends, and adjacent its sealed ends is provided with gusset folds allowing the container to be squared to facilitate its handling and storage.

When the length of stroke of plunger 55 is changed correspondingly to change the length of the containers, the members 61, 62 nevertheless always return to the upper position shown in Fig. 3, because of stroke-adjusting arrangement shown in Fig. 2, so to ensure the desired cooperation between plates 100, or equivalent, and the web-clamping members.

The mechanism disclosed and described is suitable for making the gusset type, multi-ply containers shown in Stokes application Serial No. 290,378, filed August 16, 1939.

In the modification shown in Fig. 10, members 61 and 62, and the auxiliary clamping members which relieve the heated seal from tension are similar to corresponding elements shown in Figs. 3, 6 and 8, except they are hollow to provide for passage through them of a cooling medium, such as water. Each of the auxiliary clamping members 112C, 113C, 108C and 109C may be in the form of a hollow bar sufficiently long to extend entirely across the tubing with connections between the interiors of the bars, preferably afforded by flexible tubing, allowing passage of cooling medium through the auxiliary clamping members in any desired manner; the flow of liquid may be in series through the clamping members, or the paths of the stream of cooling liquid may split for passage through the several clamping tools. Preferably, as shown, the auxiliary clamping tools are so shaped they approach as closely as possible the edges of the sealing members 104, 105.

What we claim is:

1. Apparatus for making gusset-type containers from flexible webbing comprising a stationary form about which the webbing is shaped into a tube, means for flattening the tube beyond said stationary form to effect engagement of opposite sides thereof with each other, members movable toward each other beyond said form for tucking other sides of the tube between said opposite sides of the tube before their aforesaid engagement with each other, and mechanism operable intermittently to provide for tucking movements of said members.

2. Apparatus for making gusset-type containers comprising yielding members for distending a tube of flexible material, members for engaging the exterior of said tube and movable between said yielding members, and means for effecting movement of said first-named members toward each other concurrently with movement of said second-named members toward each other between said first-named members.

3. Apparatus for making gusset-type containers from flexible webbing comprising a form about which the webbing is shaped into a tube, yielding members extending within the tube beyond the form to maintain the tube distended, tucking members for engaging the exterior of the tube beyond said form and movable between said yielding members, and members movable toward each other to flatten the tube and move said yielding members toward each other concurrently with movement between them of said tucking members.

4. Apparatus for making gusset-type containers from flexible webbing comprising a form about which the webbing is shaped into a tube, tucking tools in continuous engagement with the exterior of opposite sides of the tube beyond the form and biased for movement toward each other, yielding members within said tube resisting movement of said tucking tools, and means for flattening the tube and concurrently moving said yielding members toward each other to allow tucking movement of said tools.

5. Apparatus for making gusset-type containers from flexible webbing comprising a form about which the webbing is shaped into a tube, tube-feeding means including clamping members movable toward each other to flatten the tube beyond said form and movable away from the form while clamping the tube between them, yielding members extending within the tube beyond the form to maintain the tube distended until they are moved toward each other by said clamping members, and tucking tools operable upon aforesaid movement of said yielding members to tuck opposite sides of the tube between them.

6. Apparatus for making gusset-type containers from flexible webbing, comprising a form about which the webbing is shaped into a tube, sealing means comprising members movable toward each other to flatten the tube beyond said form and form a transverse seal, yielding members within said tube to maintain it distended beyond said form until they yield to the tube-flattening operation of said members, and tucking tools operable during yielding of said members to tuck opposite sides of the tube between them.

7. Apparatus for making gusset-type containers from flexible webbing comprising a form about which the webbing is shaped into a tube, reciprocating feeding means comprising clamping members movable toward each other to flatten the tube between them, and tucking tools beyond said form movable between said members in timed relation to their movement with respect to each other to tuck in opposite sides of the tube in advance of its clamping by said members.

8. Apparatus for making gusset-type containers from flexible webbing comprising a form about which the webbing is shaped into a tube, tube-feeding and sealing means comprising members movable toward each other to seal the tube transversely beyond said form and movable away from said form while clamping the tube between them, and movable members continuously biased in engagement with opposite sides of said tube beyond said form for movement, upon aforesaid movement of said sealing tools toward each other, effecting tucking of said sides of the tube between said sealing tools.

9. Apparatus for making gusset-type containers from flexible webbing comprising a form about which the webbing is shaped into a tube, flexible plates extending from said form as a continuation thereof, members biased in engagement with opposite sides of the tube and normally prevented from moving between said plates by the tensioned webbing, and means for flattening said tube and concurrently bending said plates toward one another to allow said biased members to tuck said opposite sides of the tube between said plates.

10. Apparatus for making gusset-type containers from flexible webbing comprising a stationary form about which the webbing is shaped into a tube, tucking tools for engaging the tube beyond said form, and means for feeding the webbing comprising reciprocating structure movable toward and from said form, members carried by said structure and movable toward each other adjacent the limit of movement of said structure toward said form to clamp the tube adjacent said tucking tools, and means for varying the length of the stroke of said reciprocating structure constructed to maintain constant the relation between said limit of movement of said structure and said tucking tools.

11. Apparatus for making containers from flexible thermoplastic webbing comprising a form about which the webbing is shaped into a tube, tube-feeding and sealing means comprising reciprocating structure, heat-sealing means carried by said structure and movable toward each other to clamp the tube between them for movement of said structure away from said form, auxiliary members carried by said structure for relieving the heated portion of the tube from feeding tension, and means for artificially cooling said auxiliary members.

12. Apparatus for making containers from flexible thermoplastic webbing comprising a form about which the webbing is shaped into a tube, tube-feeding and sealing means comprising reciprocating structure, heat-sealing members carried by said structure and movable toward each other to clamp the tube between them for movement of said structure away from said form, auxiliary hollow members carried by said structure for relieving the heated portion of the tube from feeding tension, and means for passing a cooling medium through said members.

13. Apparatus for making gusset-type containers comprising yielding means within a tube of flexible material for distending it, tucking members movable toward each other to tuck in sides of the tube in opposition to said yielding means, and sealing members for engaging and flattening other sides of the tube to include between them the sides tucked in by said tucking members.

14. Apparatus for making gusset-type containers comprising a form about which webbing is shaped into a tube, yielding members within said tube for distending it, biased members engaging opposite sides of the tube externally thereof, and reciprocable web-feeding members coacting adjacent one limit of their reciprocation with said yielding and biased members to produce tucks in said opposite sides of the tube.

15. Apparatus for making and filling gusset-type containers comprising a form about which webbing is shaped into a tube and through which filling is introduced into the containers, movable tucking members biased toward each other into engagement with opposite sides of said tube beyond the form, sealing members movable toward each other transversely to seal the tube, and means including said sealing members for controlling movement of said tucking members to form gusset folds in part included in each of the transverse seals and movable away from each other to effect reverse movement of said tucking members to position non-obstructive to introduction of filling.

16. Apparatus for making gusset-type containers from flexible webbing comprising a form about which the webbing is shaped into a tube, and means for producing gusset folds in opposite sides of the tube comprising flexible plates disposed within said tube and providing a continuation thereof yieldingly distending the tube of webbing.

17. Apparatus for making gusset-type containers from flexible webbing comprising a form about which the webbing is shaped into a tube, spaced yielding members within the tube and extending beyond said form to distend the tube, and means for flattening the tube in opposition to said yielding members and for controlling tucking between said members of the slack in the webbing produced by aforesaid flattening thereof.

JOHN R. SONNEBORN.
JONATHAN Y. ALBERTSON,